(12) United States Patent
Kasturi et al.

(10) Patent No.: US 8,873,515 B2
(45) Date of Patent: Oct. 28, 2014

(54) DYNAMIC RECEIVE DIVERSITY SWITCHING

(75) Inventors: Nitin Kasturi, Saratoga, CA (US); Vidyut M. Naware, Sunnyvale, CA (US); Ketan N. Patel, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 152 days.

(21) Appl. No.: 13/439,736

(22) Filed: Apr. 4, 2012

(65) Prior Publication Data
US 2012/0257523 A1    Oct. 11, 2012

Related U.S. Application Data

(60) Provisional application No. 61/472,110, filed on Apr. 5, 2011.

(51) Int. Cl.
*H04W 4/00* (2009.01)
*H04B 7/08* (2006.01)

(52) U.S. Cl.
CPC .......... *H04B 7/0871* (2013.01); *H04B 7/0814* (2013.01); *H04B 7/0842* (2013.01)
USPC ........................................................ 370/334

(58) Field of Classification Search
None
See application file for complete search history.

(56) References Cited

U.S. PATENT DOCUMENTS

| | | | |
|---|---|---|---|
| 7,372,842 B2 | 5/2008 | Kim et al. | |
| 7,406,070 B2 | 7/2008 | Nilsson | |
| 2003/0153358 A1 | 8/2003 | Moon et al. | |
| 2004/0053526 A1* | 3/2004 | Godfrey | 439/188 |
| 2004/0253955 A1 | 12/2004 | Love et al. | |
| 2005/0197079 A1* | 9/2005 | Banister et al. | 455/135 |
| 2006/0056281 A1* | 3/2006 | Ngo et al. | 370/208 |
| 2006/0172708 A1* | 8/2006 | Park et al. | 455/67.11 |
| 2006/0221894 A1* | 10/2006 | Casaccia et al. | 370/328 |
| 2008/0248840 A1 | 10/2008 | Kim et al. | |
| 2010/0210235 A1* | 8/2010 | Ulupinar et al. | 455/278.1 |

(Continued)

FOREIGN PATENT DOCUMENTS

| | | |
|---|---|---|
| CA | 2713468 A1 | 2/2011 |
| EP | 2288051 A1 | 2/2011 |
| JP | 2007515850 A | 6/2007 |
| WO | WO-2005002111 A2 | 1/2005 |

OTHER PUBLICATIONS

3GPP2 C.R1002-A, "cdma2000 Evaluation Methodology Revision A" 3rd Generation Partnership Project 2 "3GPP2" Version 1.0 (May 11, 2009).

(Continued)

*Primary Examiner* — Otis L Thompson, Jr.
(74) *Attorney, Agent, or Firm* — Charles E. Eggers

(57) ABSTRACT

Dynamically control of receive diversity switching in a user equipment (UE) is disclosed. By dynamically controlling the switching between enabling and disabling the receive diversity, power consumption in UEs, such as smart phones and other mobile devices may be reduced. Control is based, at least in part, on measurements for data activity performed by the UE. When the UE finds measurements that would suggest data activity, the UE will switch to enable a receive diversity state when conditions are available for the switch. Similarly, when the UE finds measurements that would suggest data inactivity, the UE will switch to disable the receive diversity state when conditions are available for the switch.

24 Claims, 3 Drawing Sheets

(56) References Cited

U.S. PATENT DOCUMENTS

2010/0279702 A1 11/2010 Kazmi et al.
2011/0170420 A1 7/2011 Xi et al.
2011/0201295 A1* 8/2011 Ma et al. ................... 455/272
2014/0112267 A1* 4/2014 Chen et al. ................... 370/329

OTHER PUBLICATIONS

International Search Report and Written Opinion—PCT/US2012/032419—ISA/EPO—May 23, 2012.

* cited by examiner

DYNAMIC RECEIVE DIVERSITY SWITCHING

CROSS REFERENCE TO RELATED APPLICATION(S)

This application claims the benefit of U.S. Provisional Application No. 61/472,110, filed Apr. 5, 2011, the entire content of which is incorporated herein by reference.

TECHNICAL FIELD

The present disclosure relates, in general, to wireless communication, and more particularly to dynamic receive diversity switching.

BACKGROUND

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

The recent growth of mobile broadband Internet has resulted in a tremendous rise in wireless data transmission. Increasing use of applications such as emails, instant messaging, social networking running on smartphones and other mobile devices have been a major factor for increases in wireless data traffic. To accommodate the increased data traffic, network operators have offered wideband technologies to provide faster data transmission. For example, wideband CDMA (WCDMA) technology enables high speed downlink throughput feasible for mobile applications. High Speed Downlink Packet Access (HSDPA) is an enhanced 3G mobile communications protocol that allows networks based on UMTS to operate at higher downlink speed feasible for mobile broadband Internet. HSDPA adapts to WCDMA to support downlink speed of up to 42 Mbit/s with further speed increases being proposed in future versions.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance the UMTS technologies not only to meet the growing demand for mobile broadband access, but to advance and enhance the user experience with mobile communications.

BRIEF SUMMARY

The various representative aspects of the present disclosure are directed to dynamically controlling receive diversity in a UE. By dynamically controlling the switching between enabling and disabling the receive diversity, power consumption in UEs, such as smart phones and other mobile devices may be reduced. Control is based, at least in part, on measurements for data activity performed by the UE. When the UE finds measurements that would suggest data activity, the UE will switch to enable a receive diversity state when conditions are available for the switch. Similarly, when the UE finds measurements that would suggest data inactivity, the UE will switch to disable the receive diversity state when conditions are available for the switch.

Representative aspects of the present disclosure are directed to a method of dynamically switching a receive diversity that includes setting the receive diversity initially to a first enablement state, measuring data activity after expiration of a measurement interval, switching the receive diversity to a second enablement state when the measured data activity indicates the second enablement state, maintaining the first enablement state when the measured data activity indicates the first enablement state, re-measuring the data activity after expiration of another measurement interval, switching the receive diversity to the first enablement state when the re-measured data activity indicates the first enablement state, and maintaining the second enablement state when the re-measured data activity indicates the second enablement state.

Further representative aspects of the present disclosure are directed to a wireless apparatus configured to dynamically switch a receive diversity that includes means for setting the receive diversity initially to a first enablement state, means for measuring data activity after expiration of a measurement interval, means for switching the receive diversity to a second enablement state when the measured data activity indicates the second enablement state, means for maintaining the first enablement state when the measured data activity indicates the first enablement state, means for re-measuring the data activity after expiration of another measurement interval, means for switching the receive diversity to the first enablement state when the re-measured data activity indicates the first enablement state, and means for maintaining the second enablement state when the re-measured data activity indicates the second enablement state.

Further representative aspects of the present disclosure are directed to a computer program product for wireless communications by a user equipment (UE) in a wireless network a non-transitory computer-readable medium having program code recorded thereon. The program code includes code to set the receive diversity initially to a first enablement state, code to measure data activity after expiration of a measurement interval, code to switch the receive diversity to a second enablement state when the measured data activity indicates the second enablement state, code to maintain the first enablement state when the measured data activity indicates the first enablement state, code to re-measure the data activity after expiration of another measurement interval, code to switch the receive diversity to the first enablement state when the re-measured data activity indicates the first enablement state, and code to maintain the second enablement state when the re-measured data activity indicates the second enablement state.

Further representative aspects of the present disclosure are directed to a wireless apparatus that includes at least one processor, a memory coupled to the processor, a plurality of antennas coupled to and operable under control of the processor, and a selection switch coupled to and operable under control of the processor. The processor is configured to set the receive diversity initially to a first enablement state, to measure data activity after expiration of a measurement interval, to switch the receive diversity to a second enablement state when the measured data activity indicates the second enablement state, to maintain the first enablement state when the measured data activity indicates the first enablement state, to re-measure the data activity after expiration of another measurement interval, to switch the receive diversity to the first enablement state when the re-measured data activity indicates the first enablement state, and to maintain the second enablement state when the re-measured data activity indicates the second enablement state.

BRIEF DESCRIPTION OF THE DRAWINGS

For a more complete understanding of the present teachings, reference is now made to the following description taken in conjunction with the accompanying drawings.

DETAILED DESCRIPTION

Figure 1:
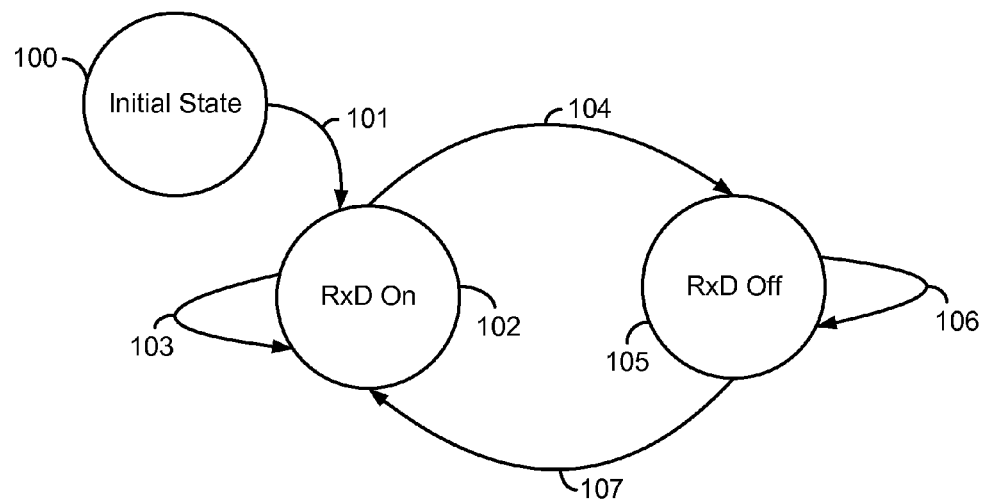
FIG. 1 is a state diagram illustrating dynamic receive diversity switching in accordance with aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as CDMA, TDMA, FDMA, OFDMA, SC-FDMA and other networks. The terms "network" and "system" are often used interchangeably. A CDMA network may implement a radio technology, such as Universal Terrestrial Radio Access (UTRA), Telecommunications Industry Association's (TIA's) CDMA2000®, and the like. The UTRA technology includes Wideband CDMA (WCDMA) and other variants of CDMA. The CDMA2000® technology includes the IS-2000, IS-95 and IS-856 standards from the Electronics Industry Alliance (ETA) and TIA. A TDMA network may implement a radio technology, such as Global System for Mobile Communications (GSM). An OFDMA network may implement a radio technology, such as Evolved UTRA (E-UTRA), Ultra Mobile Broadband (UMB), IEEE 802.11 (Wi-Fi), IEEE 802.16 (WiMAX), IEEE 802.20, Flash-OFDMA, and the like. The UTRA and E-UTRA technologies are part of Universal Mobile Telecommunication System (UMTS). UTRA, E-UTRA, UMTS, and GSM are described in documents from an organization called the "3rd Generation Partnership Project" (3GPP). CDMA2000® and UMB are described in documents from an organization called the "3rd Generation Partnership Project 2" (3GPP2). The techniques described herein may be used for the wireless networks and radio access technologies mentioned above, as well as other wireless networks and radio access technologies.

During transmission, radio frequency (RF) signals deteriorate due to multi-path distortion. Effects of multipath distortion include data corruption and signal nulling. Receive diversity is a method that has been employed to improve reception quality in WCDMA, as well as in other networks. In a receive diversity implementation, two or more spaced apart antennas are coupled to the RF receiver of an associated UE. During operation, each antenna receives a version of a signal from a slightly different spatial perspective. These individual receive channels experience different levels of fading and interference. Multiple versions of the same signal may be received and combined in the receiver. Signal processing circuits at the UE use diversity statistical combining methods on the received signal versions in order to reduce distortions or the detrimental effect of signal fading. Receive diversity, therefore, provides a method for improving the reliability of communication by using two or more communication channels with different characteristics. These diversity schemes may then play a role in reducing the effects of fading and co-channel interference.

Although receive diversity systems often offer improved signal reception in WCDMA networks, they consume more power than conventional receiver systems because multiple antennas must be simultaneously powered and the calculations for processing the multiple signals are considerably more complex. As a result, the addition of receive diversity features to smart phones and other mobile devices will increase power consumption of these devices. Because mobile devices rely on batteries as a power source, there is a tradeoff between improving the reliability of signal reception and preserving battery power.

For example, smart phones and other mobile devices that are increasingly running email applications, instant messaging applications, social networking applications, and e-commerce applications are characterized by certain time periods, in which it experiences short bursts of high data rates, and other time periods, during which no data is received at all. Wireless communication networks are often slow to release data calls. Therefore, because the network is slow to release data calls, there may be extended periods of time ("dead time") during an established data call when no data is actually being received by these smart phones and other mobile devices running applications that are conducting bursty communications. Maintaining receive diversity for the entire data call would needlessly burden the finite power source of the device battery.

According to various aspects of the disclosure, during dead times, a UE is enabled to switch from receive diversity state, in which the plurality of antennas are active and receiving, to a lower performance state, in which a single antenna is active used for receiving, thereby reducing power consumption. FIG. 1 is a state diagram illustrating dynamic receive diversity switching in accordance with aspects of the present disclosure. The process begins at an initial state 100. During the initial state transition 101, a counter is set to an initial count value. The initial count value is used in timing state transitions between enabling and disabling receive diversity. It may be set by UE manufacturers or network operators to adjust state transition triggers.

State 102 represents the first active state after initial state transition 101. State 102 represents receive diversity being ON or enabled. In additional or alternative aspects of the present disclosure, the first active state may be receive diversity in an OFF or disabled state. The present disclosure is not limited to one or the other state being the first active state. For example, in advanced UEs, such as smart phones, tablets, or the like, the first active state may be receive diversity being ON, while in other devices, such as mobile feature phones, the first active state may be receive diversity being OFF.

At episodic intervals, which may be periodic or aperiodic, the UE performs measurements to determine whether a state transition is warranted. The intervals are determined in such a manner to allow sufficient measurement statistics to be calculated in order to make an informed state transition decision. Various measurements of data reception, which would indicate whether the UE is conducting a data call, may be used for determining state transitions. In one aspect, as illustrated in FIG. 1, a successful data decode rate is used as a metric of data activity. In the illustrated example, the successful data decode rate of a shared control channel (SCCH) is used.

It should be noted that, because an SCCH is a shared channel, a UE may not easily distinguish between a SCCH failure and simply a lack of receive scheduling in an HSDPA call. However, given the representative SCCH transmission powers, the probability of an SCCH decode failure is very small. Thus, the UE would be able to imply a lack of receive scheduling when the SCCH cyclic redundancy check (CRC) fails to pass.

The data activity rate may be measured at the episodically to determine whether the UE is having a data call. For example, a periodicity of 40 ms would be a sufficient interval at which the measurements are taken and evaluated. The SCCH has a 2 ms transmission time, which would allow for up to 20 SCCHs for measurement in the 40 ms cycle. Other interval times, such as 10 ms, 20 ms, or the like, may also be selected in order to result in an adequate measurement of successful data decoding. In state 202, after the predetermined interval has elapsed, the successful data decode rate is measured in measurement interval 103.

If the successful data decode rate is less than a predetermined threshold and the counter has not been reduced to 0, the counter is decremented and the UE remains in state 102. This predetermined threshold may be set as low as 5% or, for example, 1 SCCH out of 20 SCCH in the illustrated example, or any other appropriate threshold, such as 10%, 20%, or any another similar level that would tend to indicate that the UE is not in an active data call. If the successful data decode rate is less than the threshold and the counter has reduced to 0, in state transition 104, the UE moves to state 105. In state 105, the receive diversity is switched OFF or disabled. Because only a single antenna is active for receiving in state 105, power consumption for the UE is significantly reduced.

In state 105, after the predetermined interval has elapsed, the successful data decode rate is again measured in measurement interval 106. If the successful data decode rate is less than the predetermined threshold, the counter remains at 0 and the UE remains in state 105. If, on the other hand, the successful data decode rate exceeds the threshold, the counter is reset to the initial count value, in state transition 107, and the UE moves back to state 102, in which the receive diversity is again switched ON.

As will be noted by the aspect of the disclosure illustrated in FIG. 1, this particular aspect is biased toward maintaining receive diversity enabled and, when disabled, re-activating receive diversity as quickly as possible. Depending on the intended implementation, transition conditions may be varied or modified to meet the intended goal of the implementation. For example, when the bias is desired to be toward keeping receive diversity disabled, the conditions may be the reverse of those described with respect to FIG. 1, in which the UE remains in the disabled state 105 while the counter is decremented, and, while in the active state 102, the UE immediately moves back to the disabled state when the successful decode rate exceeds the threshold value. Additional implementations may create transition conditions that allow a hysteresis to be applied at both the active state 102 and disabled state 105 before triggering a state transition.

It should be noted that the counter value, such as the initial count value may be represented in whole integer numbers, time values, or the like. As the conditions are met to decrement the counter, the amount decremented is conditioned to match the appropriate implementation. Moreover, the counter may be implemented to count up to a trigger value. Thus, when the particular conditions are met, amounts are added to the counter until the trigger value is exceeded. The various aspects of the present disclosure may be implemented in any number of different ways and still fall within the intended scope herein.

Figure 2:
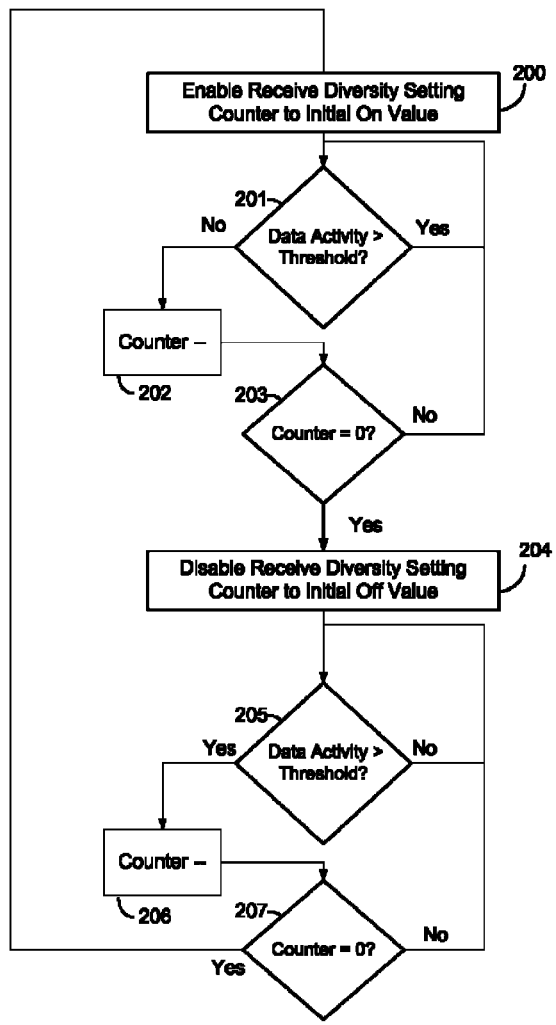
FIG. 2 is a functional block diagram illustrating example blocks executed to implement one aspect of the present disclosure.

FIG. 2 is a functional block diagram illustrating example blocks executed to implement one aspect of the present disclosure. In block 200, receive diversity is enabled and the counter is set to an initial ON value. After expiration of the measurement interval, data activity measurements are taken. A determination is made, in block 201, whether the data activity associated with the measurement are greater than a threshold value. If so, then receive diversity remains ON and the process will continue after expiration of the next measurement interval.

If the measured data activity does not exceed the threshold value, then, in block 202, the counter is decremented. A determination is made, in block 203, whether the counter has reached 0. If not, then the process again continues at block 202 after expiration of the next measurement threshold. If the counter has reached 0, then, in block 204, receive diversity is disabled and the counter is now set to the initial OFF value.

After measurements are taken with the expiration of the next measurement interval, another determination is made, in block 205, whether the data activity exceeds a threshold. If not, then, the next measurement interval is started, after which measurements will again be taken. If the measured data activity exceeds the threshold, then, in block 206, the counter is decremented. A determination is made, in block 207, whether the counter has reached 0. If not, then the process continues at block 205 after expiration of the next measurement interval. If the counter has reached 0, then receive diversity is again enabled, in block 200.

Figure 3:
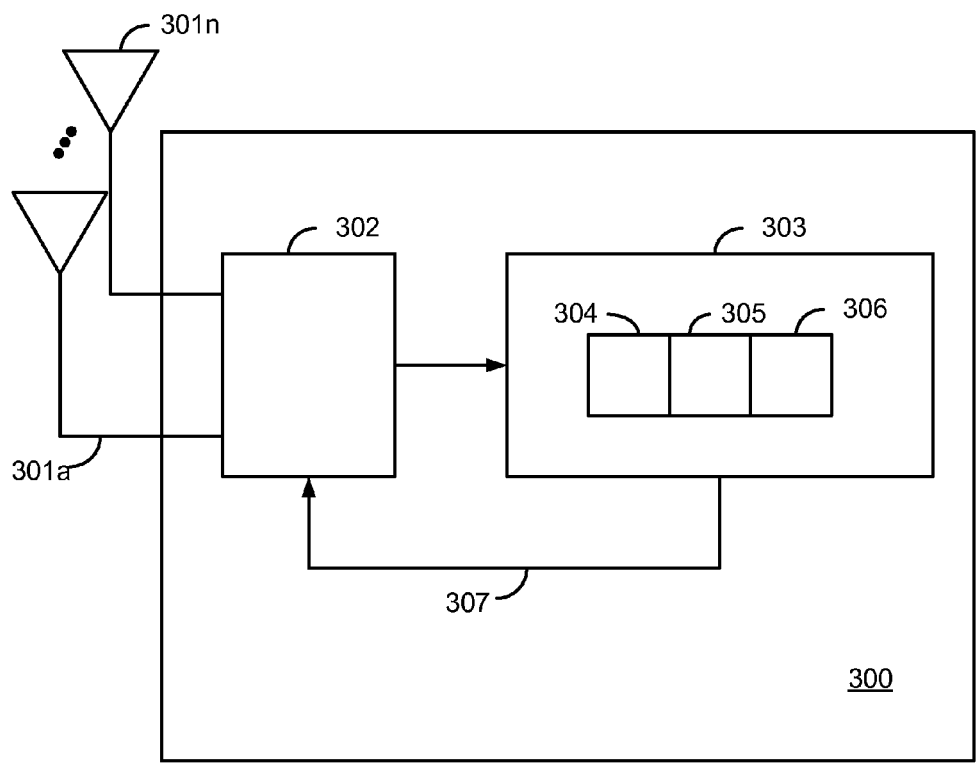
FIG. 3 is a block diagram of a wireless apparatus configured to implement dynamic receive diversity switching in accordance with various aspects of the present disclosure.

FIG. 3 is a block diagram of a wireless apparatus 300 configured to implement dynamic receive diversity switching in accordance with various aspects of the present disclosure. Wireless apparatus 300 includes multiple antennas 301-302 selectively coupled to receiver 303 via switch 302. Switch 302 is configured to either couple all of antennas 301a-301n to receiver 303 or couple only one of antennas 301a-301n to receiver 303. In a receive diversity ON state, the antennas 301a-301n are coupled to receiver 303. In a receive diversity OFF state, only one of antennas 301a-301n is connected to receiver 303.

When RF signals are received by one or all of antennas 301a-301n, the signal is transferred to receiver 303 via switch 302. Receiver 303 comprises signal processor 304, counter register 305 and comparator 306 to execute the aforementioned switching process. The signal processor 304 determines data activity by measuring data reception, the successful decode rate, or the like, and controlling comparator 306 to compare the measured value to a predetermined threshold. If data activity is detected, receiver 303 sends control signal 307 instructing switch 302 to continue to maintain receive diversity in the ON state by maintaining the coupling of all of the antennas 301a-301n to receiver 303. If, however, it is determined that there is no current data activity, signal processor 304 decrements the counter value stored in counter register 305. If, after decrementing the counter value, the counter value stored in counter register 305 has not yet expired or reached 0, receive diversity remains in the ON state. Only if there has been no data activity and the counter value stored in counter register 305 has expired, receiver 303 sends control signal 307 instructing switch 302 to disable receive diversity by causing the coupling of only one of the antennas 301a-301n to receiver 303.

Figure 4:
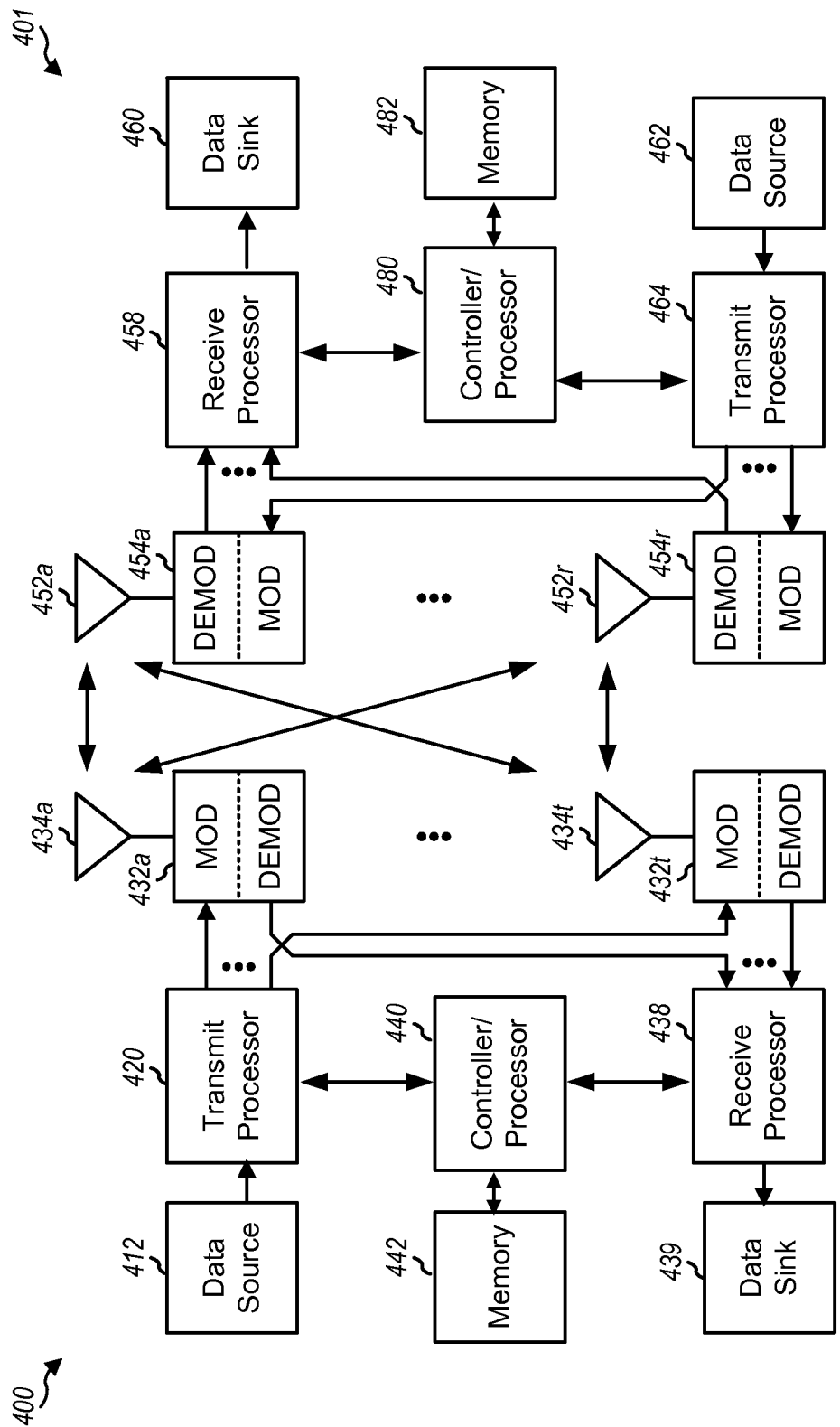
FIG. 4 is a block diagram conceptually illustrating a design of a base station/eNB and a UE configured according to one aspect of the present disclosure.

FIG. 4 shows a block diagram of a design of a base station/access point 400 and a UE 401. The access point 400 may be a base station that performs, among other things, various physical layer functions (modulation, coding, interleaving, rate adaptation, spreading, and the like). The access point 400 maintains communication with a radio network controller (RNC) (not shown) that controls the radio resources in the related coverage areas through its associated base stations, such as access point 400. The access point 400 may be equipped with antennas 434a through 434t, and the UE 401 may be equipped with antennas 452a through 452r.

At the access point 400, a transmit processor 420 may receive data from a data source 412 and control information from a controller/processor 440. The transmit processor 420 may process and code the data and control information and may provide output streams to the modulators (MODs) 432a through 432t. Each modulator 432 may process a respective output stream to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 401, the antennas 452a through 452r may receive the downlink signals from the access point 400 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples to obtain received symbols. A receive processor 458 may process (e.g., demodulate, deinterleave, and decode) the detected symbols, provide decoded data for the UE 401 to a data sink 460, and provide decoded control information to a controller/processor 480.

On the uplink, at the UE 401, a transmit processor 464 may receive and process data from a data source 462 and control information from the controller/processor 480. The processed data and control information from the transmit processor 464 may be processed by the demodulators 454a through 454r, and transmitted to the access point 400. At the access point 400, the uplink signals from the UE 401 may be received by the antennas 434, processed by the modulators 432, and further processed by a receive processor 438 to obtain decoded data and control information sent by the UE 401. The processor 438 may provide the decoded data to a data sink 439 and the decoded control information to the controller/processor 440.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIG. 2 may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of non-transitory storage medium known in the art. An exemplary storage medium is coupled to the processor such that the processor can read information from, and write information to, the storage medium. In the alternative, the non-transitory storage medium may be integral to the processor. The processor and the storage medium may reside in an ASIC. The ASIC may reside in a user terminal In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both non-transitory computer-readable media and communication media including any medium that facilitates transfer of a computer program from one place to another. A non-transitory storage media may be any available media that can be accessed by a general purpose or special purpose computer. By way of example, and not limitation, such non-transitory computer-readable media may comprise RAM, ROM, EEPROM, CD-ROM or other optical disk storage, magnetic disk storage or other magnetic storage devices, or any other medium that can be used to store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of dynamically switching a receive diversity, comprising:
    setting the receive diversity initially to an ON state;
    measuring data activity after expiration of a measurement interval;
    switching the receive diversity to an OFF state when the measured data activity indicates absence of data activity;
    maintaining the ON state when the measured data activity indicates presence of data activity;
    when in the OFF state, re-measuring the data activity after expiration of another measurement interval;
    switching the receive diversity to the ON state when the re-measured data activity indicates presence of data activity; and
    maintaining the OFF state when the re-measured data activity indicates absence of data activity.

2. The method of claim 1, further comprising:
    setting a counter to an initial first value when the receive diversity is initially set to the ON state;
    wherein the ON state is a default first active state; and
    wherein the switching the receive diversity to the OFF state comprises:
        decrementing the counter when the measured data activity exceeds a first threshold; and
        switching the receive diversity to the OFF state when the counter is decremented to zero.

3. The method of claim 2, further comprising:
    setting the counter to an initial second value when the receive diversity is switched to the OFF state;
    wherein the switching the receive diversity to the ON state comprises:
        decrementing the counter when the re-measured data activity exceeds a second threshold; and
        switching the receive diversity to the ON state when the counter is decremented to zero.

4. The method of claim 3, further comprising:
    adjusting the first value and the second value to bias switching towards maintaining the ON state.

5. The method of claim 1, wherein the measuring and re-measuring comprise:
    calculating a successful decode rate of a shared control channel.

6. The method of claim 1, wherein the switching the receive diversity to the OFF state comprises coupling one of a plurality of antennas to receive data, and wherein the switching the receive diversity to the ON state comprises coupling the plurality of antennas to receive data.

7. A wireless apparatus configured to dynamically switch a receive diversity, comprising:
    means for setting the receive diversity initially to an ON state;
    means for measuring data activity after expiration of a measurement interval;
    means for switching the receive diversity to an OFF state when the measured data activity indicates absence of data activity;
    means for maintaining the ON state when the measured data activity indicates presence of data activity;
    means for re-measuring the data activity, when in the OFF state, after expiration of another measurement interval;
    means for switching the receive diversity to the ON state when the re-measured data activity indicates presence of data activity; and
    means for maintaining the OFF state when the re-measured data activity indicates absence of data activity.

8. The wireless apparatus of claim 7, further comprising:
    means for setting a counter to an initial first value when the receive diversity is initially set to the ON state;
    wherein the first ON state is a default first active state; and
    wherein the means for switching the receive diversity to the OFF state comprises:
        means for decrementing the counter when the measured data activity exceeds a first threshold; and
        means for switching the receive diversity to the OFF state when the counter is decremented to zero.

9. The wireless apparatus of claim 8, further comprising:
    means for setting the counter to an initial second value when the receive diversity is switched to the OFF state;
    wherein the means for switching the receive diversity to the ON state comprises:
        means for decrementing the counter when the re-measured data activity exceeds a second threshold; and means for switching the receive diversity to the ON state when the counter is decremented to zero.

10. The wireless apparatus of claim 9, further comprising: means for adjusting the first value and the second value to bias switching towards maintaining the ON state.

11. The wireless apparatus of claim 7, wherein the means for measuring and means for re-measuring comprise: means for calculating a successful decode rate of a shared control channel.

12. The wireless apparatus of claim 7, wherein the means for switching the receive diversity to the OFF state comprises means for coupling one of a plurality of antennas to receive data, and wherein the means for switching the receive diversity to the ON state comprises means for coupling the plurality of antennas to receive data.

13. A computer program product for wireless communications by a user equipment (UE) in a wireless network, comprising:
a non-transitory computer-readable medium having program code recorded thereon, the program code comprising:
program code to set the receive diversity initially to an ON state;
program code to measure data activity after expiration of a measurement interval;
program code to switch the receive diversity to an OFF state when the measured data activity indicates absence of data activity;
program code to maintain the ON state when the measured data activity indicates presence of data activity;
program code to re-measure the data activity, when in the OFF state, after expiration of another measurement interval;
program code to switch the receive diversity to the ON state when the re-measured data activity indicates presence of data activity; and
program code to maintain the OFF state when the re-measured data activity indicates absence of data activity.

14. The computer program product of claim 13, further comprising:
program code to set a counter to an initial first value when the receive diversity is initially set to the ON state;
wherein the first ON state is a default first active state; and
wherein the program code to switch the receive diversity to the OFF state comprises:
program code to decrement the counter when the measured data activity exceeds a first threshold; and
program code to switch the receive diversity to the OFF state when the counter is decremented to zero.

15. The computer program product of claim 14, further comprising:
program code to set the counter to an initial second value when the receive diversity is switched to the OFF state;
wherein the program code to switch the receive diversity to the first enablement state comprises:
program code to decrement the counter when the re-measured data activity exceeds a second threshold; and
program code to switch the receive diversity to the ON state when the counter is decremented to zero.

16. The computer program product of claim 15, further comprising:
program code to adjust the first value and the second value to bias switching towards maintaining the ON state.

17. The computer program product of claim 13, wherein the program code to measure and program code to re-measure comprise:
program code to calculate a successful decode rate of a shared control channel.

18. The computer program product of claim 13, wherein the program code to switch the receive diversity to the OFF state comprises coupling one of a plurality of antennas to receive data, and wherein the program code to switch receive diversity to the ON state comprises coupling the plurality of antennas to receive data.

19. A wireless apparatus, comprising:
at least one processor;
a memory coupled to the at least one processor;
a plurality of antennas coupled to and operable under control of the at least one processor;
a selection switch coupled to and operable under control of the at least one processor;
wherein the at least one processor is configured:
to set the receive diversity initially to an ON state;
to measure data activity after expiration of a measurement interval;
to switch the receive diversity to an OFF state when the measured data activity indicates absence of data activity;
to maintain the ON state when the measured data activity indicates presence of data activity;
when in the OFF state, to re-measure the data activity after expiration of another measurement interval;
to switch the receive diversity to the ON state when the re-measured data activity indicates presence of data activity; and
to maintain the OFF state when the re-measured data activity indicates absence of data activity.

20. The wireless apparatus of claim 19, wherein the at least one processor is further configured to set a counter stored in the memory to an initial first value when the receive diversity is initially set to the ON state,
wherein the ON state is a default first active state; and
wherein the configuration of the at least one processor to switch the receive diversity to the OFF state comprises configuration:
to decrement the counter when the measured data activity exceeds a first threshold; and
to switch the receive diversity to the OFF state when the counter is decremented to zero.

21. The wireless apparatus of claim 20, wherein the at least one processor is further configured to set the counter stored in the memory to an initial second value when the receive diversity is switched to the OFF state, wherein the configuration of the at least one processor to switch the receive diversity to the first enablement state comprises configuration:
to decrement the counter when the re-measured data activity exceeds a second threshold; and
to switch the receive diversity to the ON state when the counter is decremented to zero.

22. The wireless apparatus of claim 21, wherein the at least one processor is further configured:
to adjust the first value and the second value to bias switching towards maintaining the ON state.

23. The wireless apparatus of claim 19, wherein the configuration of the at least one processor to measure and to re-measure comprise configuration to calculate a successful decode rate of a shared control channel.

24. The wireless apparatus of claim 19, wherein the configuration of the at least one processor to switch the receive diversity to the OFF state comprises configuration to enable the selection switch to couple one of a plurality of antennas to receive data, and wherein the configuration of the at least one processor to switch the receive diversity to the ON state comprises configuration to enable the selection switch to couple the plurality of antennas to receive data.

* * * * *